April 14, 1964  M. WARNECKE ETAL  3,128,809
DRUPE SPLITTER AND PITTER

Filed Jan. 11, 1960  3 Sheets-Sheet 1

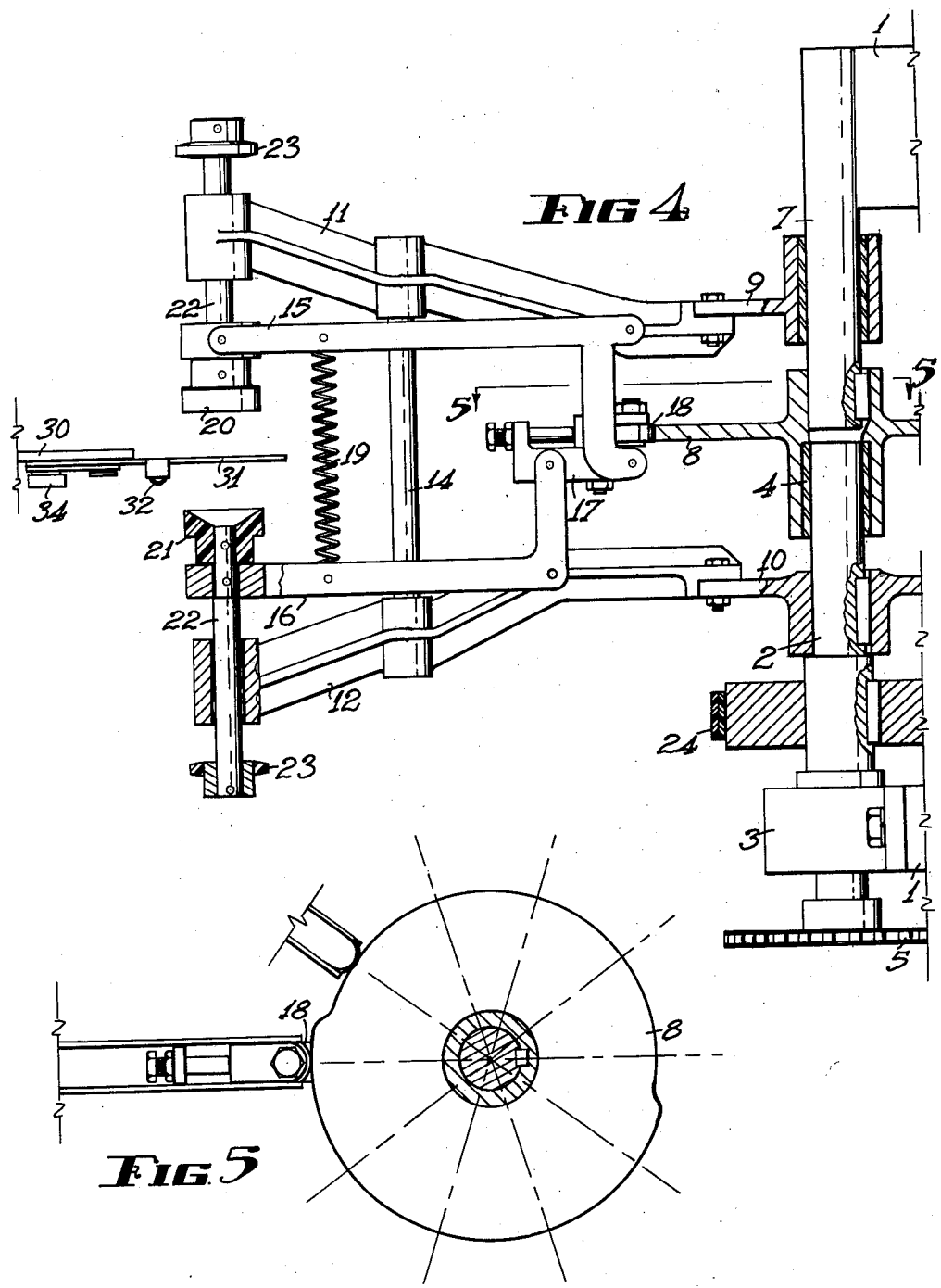

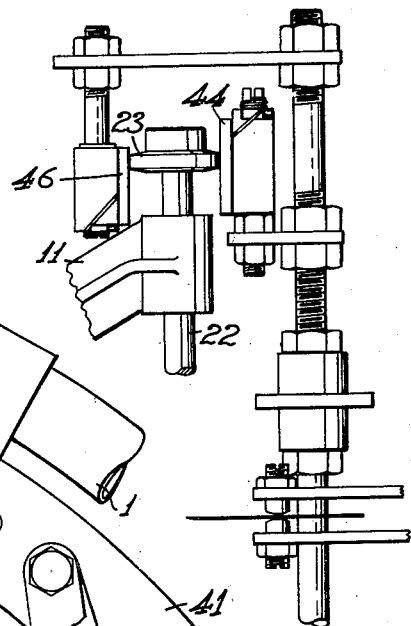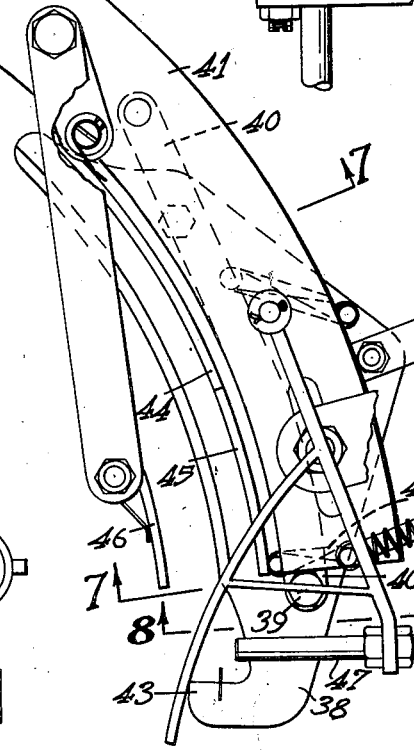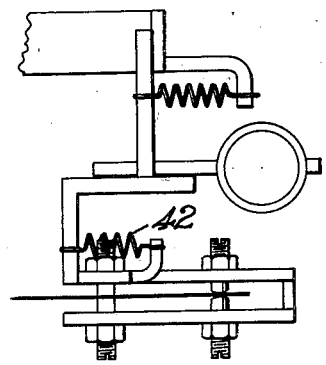

United States Patent Office 3,128,809
Patented Apr. 14, 1964

3,128,809
DRUPE SPLITTER AND PITTER
Marcus Warnecke, Laurence Percy Kupke, and Leslie Chalmers, all of Nuriootpa, South Australia, Australia, and Ivon Garnet Rock, 13 Balmoral Ave., Berkeley, Brighton, South Australia, Australia
Filed Jan. 11, 1960, Ser. No. 1,746
Claims priority, application Australia Jan. 12, 1959
3 Claims. (Cl. 146—28)

This invention relates to an improved fruit splitter and pitter and in particular it relates to a mechanism whereby the stones can be removed from fruit after it has been halved.

The invention has as its objects the provision of a machine which will be able, efficiently and economically to split the fruit on a plane and remove the stone from the fruit.

In its simplest form the invention comprises a frame, bearing means on the frame, a rotatable member in said bearing means, a plurality of arms radiating outwardly from the rotatable member, the arms being arranged in pairs, fruit engaging cups rotationally supported by the arms, the cups of each pair of arms being centered about a medial plane, a fruit splitting knife in the medial plane, stone removing means on the knife, means to rotate each pair of cups in one direction as they traverse the splitting knife, and means to rotate one of the cups in the reverse direction at the completion of cutting.

By the use of a device constructed according to this invention it is possible to cut fruit such as apricots along a single plane without slivers, and to separate the halves from the stone effectively and economically.

However, one of the problems which is encountered in fruit splitting machines in general is that a well constructed and designed machine will operate at a much higher rate than the rate at which an operator can feed it.

A further object of this invention is to provide means of feeding fruit to a splitting and pitting machine which will be considerably faster than the conventional hand feeding.

A still further object is to provide a sorting means whereby an operator can sort fruit passing at relatively low speed, but the fruit may nevertheless be transferred to a part of the machine operating at high velocity.

These objects are achieved by means of an endless chain with a number of outwardly projecting members arranged to clamp a piece of fruit, the chain travelling between a pair of sprockets and transferring the fruit from the outwardly projecting members to the cups of the machine while the chain is passing over one of its supporting sprockets.

Figure 1:
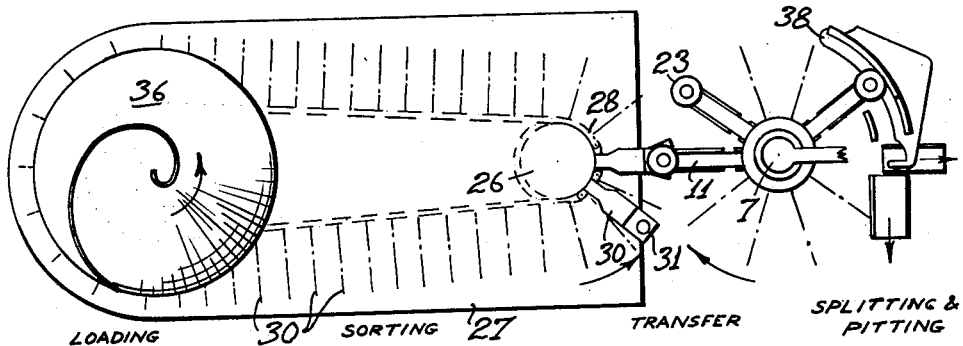
Figure 2:
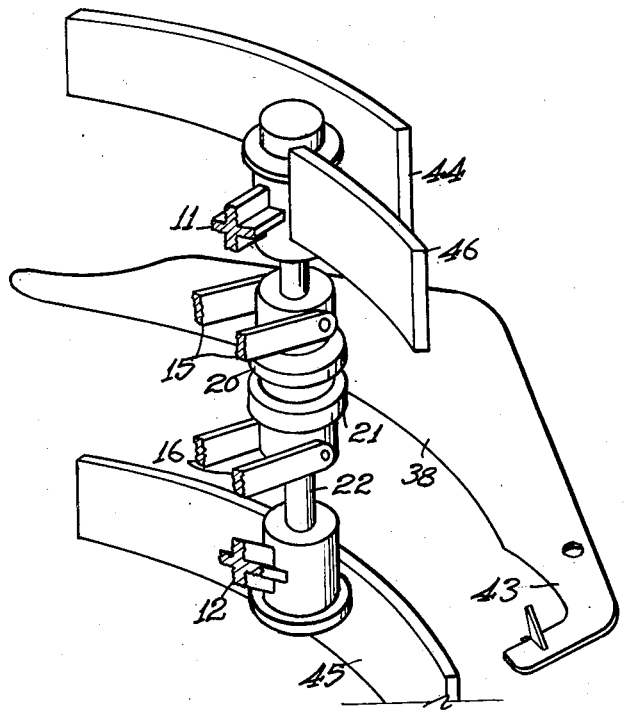
Figure 3:
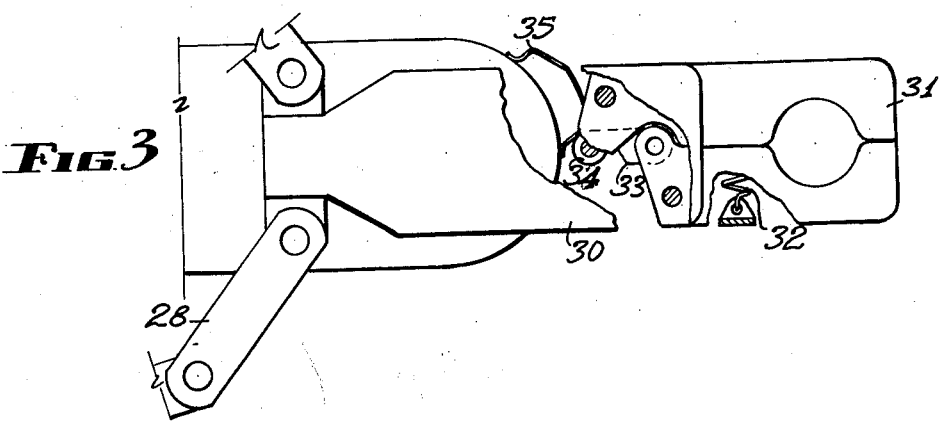

It will be clear from the following description that the invention includes many ancilliary features within its scope, and the invention will now be described in further detail with reference to an embodiment illustrated in the accompanying drawings in which:

FIG. 1 is a general layout drawing of the machine in plan,

FIG. 2 is an enlarged perspective view illustrating the operation of cutting and stoning, FIG. 3 is an enlarged fragmentary view of an outwardly extending member, FIG. 4 is an enlarged part section showing the mechanism of the arms and fruit engaging cups, FIG. 5 is a section on line 5—5 of FIG. 4, FIG. 6 shows the mechanism of the cutting and pitting portion of the device to an enlarged scale, FIG. 7 is a fragmentary view taken on lines 7—7 of FIG. 6, and FIG. 8 is a fragmentary view taken on lines 8—8 of FIG. 6.

A main frame 1 carries on it a vertical column 2 supported in the bearing block 3 at its lower end and by the bearing 4 at its upper end so that the vertical column 2 is free to rotate.

A driving chain 5 drives the vertical column 2 in synchronism with the remainder of the device by means of roller chains (not shown).

A downwardly projecting stem 7 is fixed to the main frame 1 and has keyed to its lower end a cam 8. This cam 8 also houses the bearing 4 at the top end of the column 2 and thereby supports the column 2.

An upper spider 9 and a lower spider 10 support a series of upper radial arms 11 and lower radial arms 12 respectively. The upper spider 9 is rotationally supported by the stem 7. A spacer member 14 retains each pair of arms 11 and 12 in fixed relationship with each other. An upper cup supporting member 15 is hinged to the upper radial arm 11 in each case and a lower cup supporting member 16 is hinged to the lower radial arm 12 in each case, these cup supporting members being of bellcrank shape and being interconnected by means of a link 17 to which is mounted a roller 18, each roller 18 engaging the edge face of the cam 8 to thereby either open or allow to close the cup-supporting members 15 and 16.

These members are drawn together by means of the spring 19. The cups 20 and 21 are of resilient material of such shape that they engage the fruit which is fed to them, and in each case are riveted to the spindles 22, each spindle 22 being both rotatable and slidable within a bearing on the end of one of the radial arms, the ends of the spindles 22 each being provided with a rubber roller 23.

A constantly applied brake 24 operates on the vertical column 2 to assist the attainment of smoothness of operation when the operating parts of the device become worn.

Chain drive means (not shown) interconnect the column 2 with a driving sprocket 26 mounted on a sorting table 27, the sprocket 26 driving a chain 28 to which is secured a plurality of outwardly extending members 30, each of these outwardly extending members 30 being provided with a bifurcated end 31, the bifurcated end 31 being apertured so that when closed by the spring 32, the bifurcated end 31 can clamp a piece of fruit. The link mechanism 33 (see FIG. 3) ensures that the bifurcated end 31 opens symmetrically about the center line of the member 30.

The roller 34 acts on the cam 35 to control this opening. A conical feed device 36 of conventional type is used to feed the fruit to the bifurcated ends 31 of the members 30 and thereby pre-position them prior to final arranging on the sorting table 27 by an operator.

A knife 38 of stainless steel is hinged at 39 to a bracket 40, the bracket 40 itself being hinged to a sub-frame 41 secured to the main frame 1. This knife is retained in its outer position by means of the spring 42, but can move rearwardly if engaged by a large stone or the like.

The end of the knife 38 is shaped at 43 to remove the stone of an apricot or other piece of fruit after the fruit has been cut.

Adjacent the knife 38 is an upper runner 44 adapted to engage the rubber roller 23 on the upper arm 11, a lower runner 45 engaging the lower roller 23 on the lower arm 12, and the upper and lower rollers both turning in the same direction until the upper roller runs past the end of the upper runner 44. The rotational speed of the rollers is such that an average size stone will roll on the knife 38 without sliding along the cutting edge, this feature protecting the knife.

The upper roller then engages a second upper runner 46 which reverses the direction of rotation thereby applying a twist to the upper half of the fruit and freeing the fruit from the stone.

The stone is then ejected from the fruit by means of the shaped end of the knife 43, which operates in conjunction with a pin 47.

At this stage the roller 18 again rides up on the cam 8 to separate the cups 20 and 21 so that the fruit is released to be discharged down a discharge chute, the stone also being discharged but down a separate chute.

In the embodiments shown, the spiders support 10 radial arms, and the radius of rotation of the centres of the cups is the same as the radius of rotation of the outwardly extending members 30 as they pass the transfer point, so as to ensure smooth transfer.

It will be seen from the above that this invention provides a simple and effective means for halving fruit such as apricots and disposing of the stones. It has been found that a machine constructed according to the above embodiment is effective at high speeds, does not unduly damage fruit, and rejects all but a very small proportion of stones.

We claim:

1. An improved fruit splitter and pitter comprising a main frame, bearing means on the main frame, a rotatable member in said bearing means, arms radiating in pairs outwardly from said rotatable member, fruit engaging cups each rotationally supported on the end of an arm, a sub frame on the main frame, a bracket hinged near one end to said sub frame, a splitting knife hinged near one end to the other end of said bracket, a spring between said knife and said bracket and a spring between said bracket and said sub frame, stone removing means on said knife near its hinged end, means to rotate each pair of cups in one direction as they traverse said splitting knife, said springs urging said knife into fruit retained between a pair of cups to follow the contour of the stone in said fruit as said fruit rolls over said knife, a sorting table, a chain on sprockets on said sorting table, outwardly extending members with bifurcated ends on said chain, means to close the bifurcated ends to receive fruit, means to open said bifurcated ends to release fruit, and means to synchronise relative motion of said arms and said outwardly extending members whereby fruit is transferred from said outwardly extending members to said cups.

2. An improved fruit splitter and pitter comprising a main frame, bearing means on the main frame, a rotatable member in said bearing means, arms radiating in pairs outwardly from said rotatable member, fruit engaging cups each rotationally supported on the end of an arm, a sub frame on the main frame, a bracket hinged near one end to said sub frame, a splitting knife hinged near one end to the other end of said bracket, a spring between said knife and said bracket and a spring between said bracket and said sub frame, stone removing means on said knife near its hinged end, means to rotate each pair of cups in one direction as they traverse said splitting knife, said springs urging said knife into fruit retained between a pair of cups to follow the contour of the stone in said fruit as said fruit rolls over said knife, means to rotate one of said cups in the reverse direction at completion of cutting, a sorting table, a chain on sprockets on said sorting table, outwardly extending members with bifurcated ends on said chain, spring means to close said bifurcated ends and cam means to open said bifurcated ends, and drive means synchronising relative motion of said arms and said outwardly extending members whereby fruit is transferred from said outwardly extending members to said cups.

3. An improved fruit splitter and pitter comprising a main frame, bearing means on the main frame, a rotatable member in said bearing means, arms radiating in pairs outwardly from said rotatable member, the arms of each pair being disposed one beyond the other, fruit engaging cups each on the end of a spindle rotationally supported in a bearing on the end of an arm, link means between cup supporting members maintaining the cups central about a medial plane, a sub frame on the main frame, a bracket hinged near one end to said sub frame, a splitting knife in said medial plane hinged near one end to the other end of said bracket, a spring between said knife and said bracket and a spring between said bracket and said sub frame, rollers on said cup supporting members engageable against a cam to control opening of said cups, a spring between the upper and lower cup supporting members on each pair of arms to retain the cups closed, a friction roller on each said spindle operable against runners on the frame to rotate the cups first both in the same direction to roll fruit engaged between a pair of cups over the knife and then in opposite directions to separate the portions of fruit after cutting, a shaped end on said knife to eject the stone from fruit after cutting, a sorting table, a chain on sprockets on said sorting table, outwardly extending members with bifurcated ends on said chain, spring means to close said bifurcated ends and cam means to open open said bifurcated ends, conical feed means to feed fruit to be clamped in said bifurcated ends, and drive means synchronising relative motion of said arms and said outwardly extending members whereby fruit is transferred from said outwardly extending members to said cups.

References Cited in the file of this patent

UNITED STATES PATENTS

| | | |
|---|---|---|
| 596,343 | Topp | Dec. 28, 1897 |
| 2,047,006 | Crawford | July 7, 1936 |
| 2,735,466 | Krstinch | Feb. 21, 1956 |
| 2,745,453 | Perrelli et al. | May 15, 1956 |
| 2,788,818 | Skog | Apr. 16, 1957 |